(No Model.) 4 Sheets—Sheet 1.

G. PUHL & A. MERTES.
BAND SAWING MACHINE.

No. 350,894. Patented Oct. 12, 1886.

(No Model.) 4 Sheets—Sheet 2.

G. PUHL & A. MERTES.
BAND SAWING MACHINE.

No. 350,894. Patented Oct. 12, 1886.

Witnesses
Jno Hadley Doyle
H. B. Bryan

Inventors
George Puhl
August Mertes
By Connolly Bros
attys (No Model.) 4 Sheets—Sheet 3.

G. PUHL & A. MERTES.
BAND SAWING MACHINE.

No. 350,894. Patented Oct. 12, 1886.

(No Model.) 4 Sheets—Sheet 4.

G. PUHL & A. MERTES.
BAND SAWING MACHINE.

No. 350,894. Patented Oct. 12, 1886.

Witnesses
Jno Hadley Doyle
W. B. Bryan

Inventors
George Puhl
and August Mertes
By Connolly Bros
Attys

UNITED STATES PATENT OFFICE.

GEORGE PUHL AND AUGUST MERTES, OF ALLEGHENY, PENNSYLVANIA; SAID MERTES ASSIGNOR TO JOHN LIPPINCOTT, OF BALTIMORE, MD.

BAND SAWING-MACHINE.

SPECIFICATION forming part of Letters Patent No. 350,894, dated October 12, 1886.

Application filed August 4, 1885. Serial No. 173,548. (No model.)

*To all whom it may concern:*

Be it known that we, GEORGE PUHL and AUGUST MERTES, of Allegheny, in the county of Allegheny and State of Pennsylvania, have invented certain new and useful Improvements in Machines for Slicing Meat; and we do hereby declare that the following is a full, clear, and exact description of the invention, which will enable others skilled in the art to which it appertains to make and use the same, reference being had to the accompanying drawings, which form a part of this specification, in which—

Figure 1:
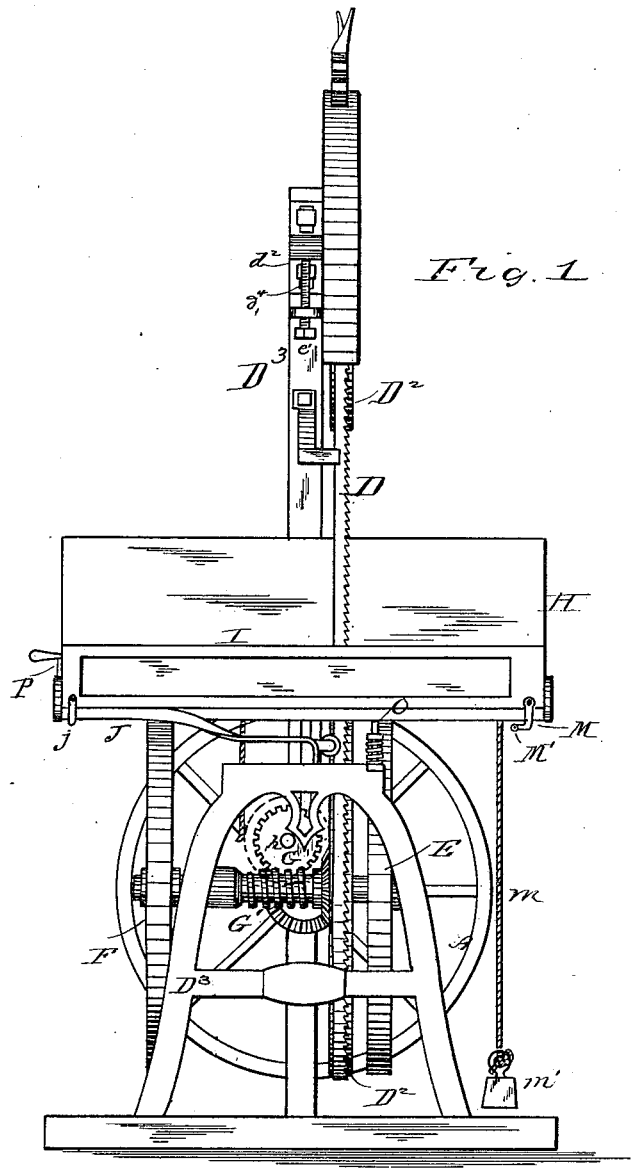
Figure 2:
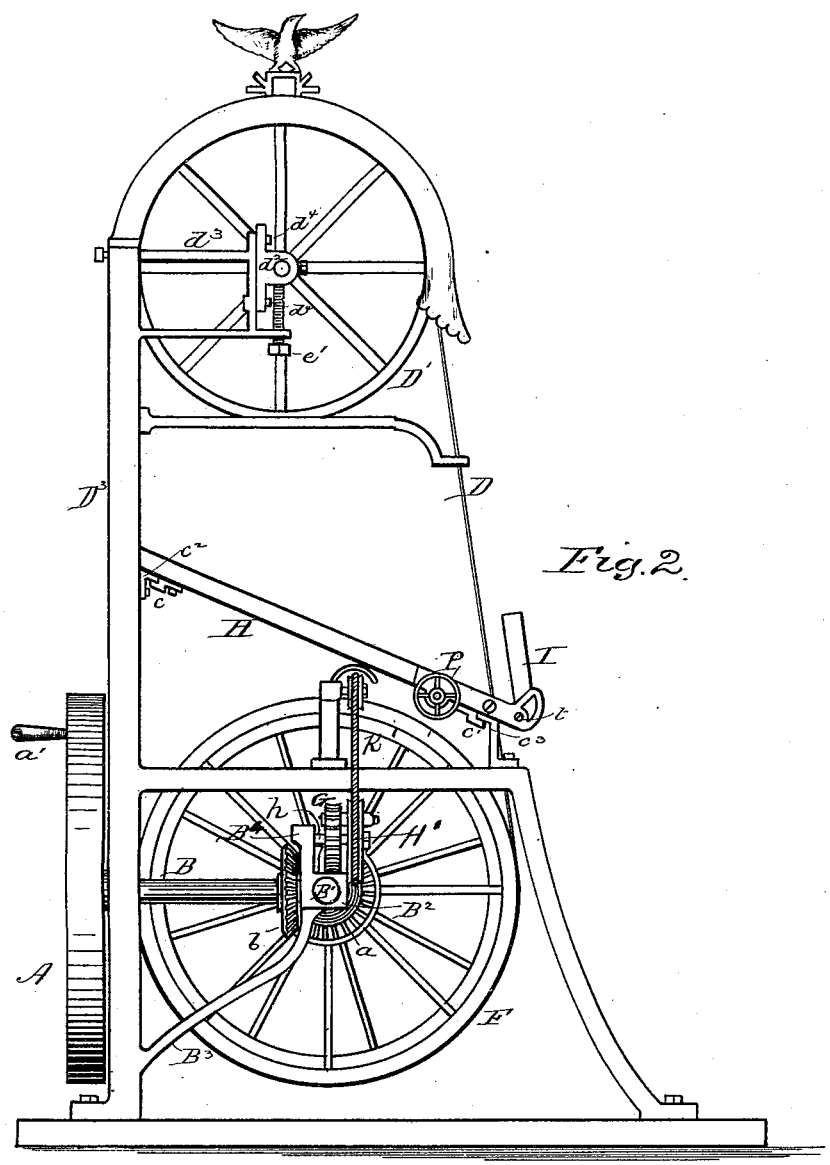
Figure 3:
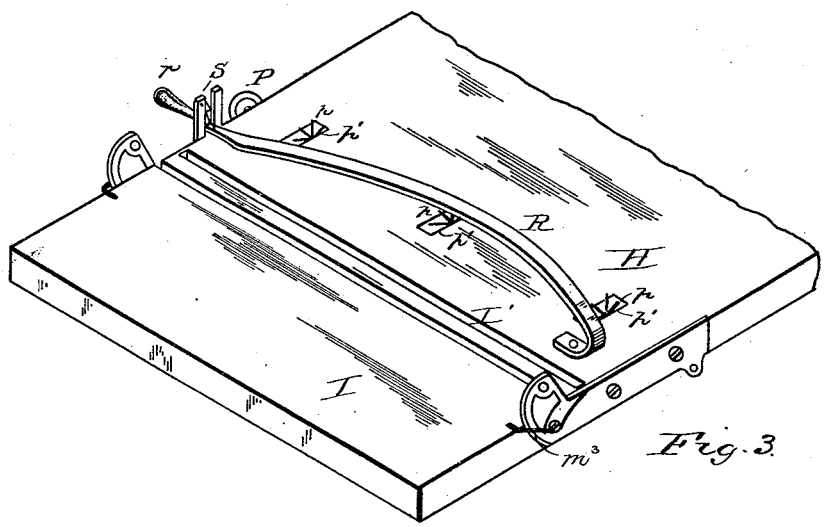
Figure 4:
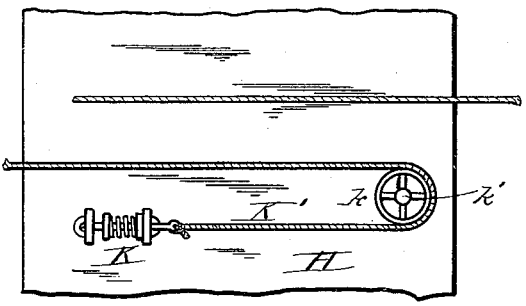
Figure 5:
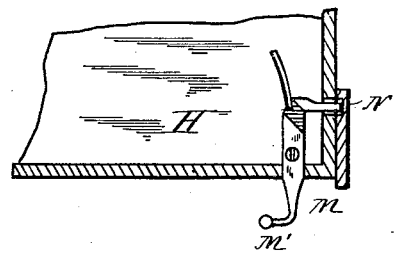
Figure 6:
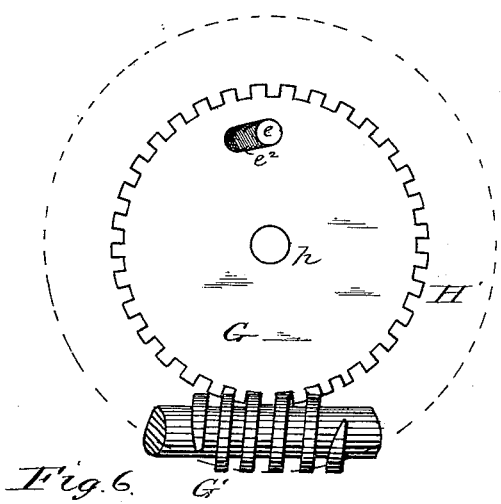
Figure 7:
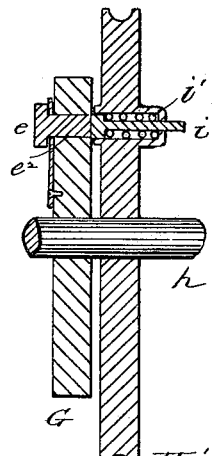
Figure 8:
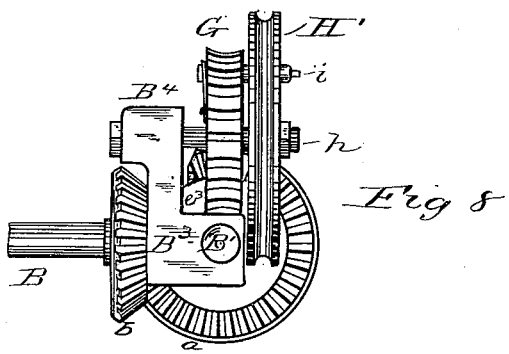

Figure 1 is a front elevation of a machine embodying our invention. Fig. 2 is a side elevation of the same. Fig. 3 is a perspective view of the movable table. Figs. 4 and 5 are detail views of the table. Figs. 6, 7, and 8 are detail views of the mechanism for moving the table.

This invention has relation to machines for slicing meat, and particularly for slicing ham; and it consists in the novel construction and combination of devices for operating a band-saw by which the meat is sliced, and for effecting the feed of the table upon which the meat rests while being cut, the object being to obtain an automatic movement of said table to the right and left, as well as to provide for such other mechanical movements and adjustments as may be necessary or expedient in cutting the meat evenly, economically, and quickly, all as hereinafter more fully described.

For the purposes of our invention we employ a band-saw, D, carried over and by two band-saw pulleys, $D' D^2$, mounted on a frame, $D^3$.

For the purposes of adjustment to regulate the tension of the band-saw we support the upper band-pulley, D', in slotted bearings $d^2$, which move vertically upon the face of a bracket, $d^3$, into which are set nuts $d^4$, which play in the slotted portion of the bearings. An adjusting-screw, $e'$, passing upward through an arm of said bracket and abutting against the under side of the bearing, serves as a medium through which the adjustment of the pulley is effected and the tension of the saw regulated. The lower pulley, $D^2$, is mounted on a horizontal shaft, B', which is journaled to the frame of the machine and to a block, $B^2$, supported by a standard, $B^3$, and upon the ends of said shaft are keyed the balance-wheels E F. Motion is communicated to the shaft B' through the medium of the beveled gear-wheels $a b$, keyed to said shafts B B', respectively, the shaft B, which is journaled in the frame of the machine and in block $B^2$ at right angles to the shaft B', being also provided with a balance crank-wheel, A, having a crank-handle, $a'$, by which motion is given to the shaft B.

H designates the table upon which the meat rests while being sliced. Said table is arranged to incline downwardly from its inner edge at an angle of about twenty degrees. It will be seen that by placing the table at this angle a much wider slice of meat will be cut than would be if the table were level. To the under side of this table is attached the flanged guides $c c'$, which embrace the flanged portions of the tracks or ways $c^2 c^3$, secured to the frame of the machine. The table H has hinged to its forward portion a leaf, I, which is adapted to be raised and lowered in the manner and for the purpose hereinafter explained. Near its forward edge the table H has a slot, I', running nearly its entire length, and intended for the passage and play of the band-saw.

The table H is designed to have a lateral reciprocating movement, which is imparted to it in the following manner: Attached to the under side of said table at any convenient point is a spring-shackle, K, to the movable stem of which is secured a rope, K', which passes over a pulley, $k$, mounted on a standard, $k'$, and is wound upon a drum, H', loosely mounted on a short horizontal shaft, $h$, journaled in and to a standard, $B^4$, mounted on the block $B^2$. This shaft has keyed to it a worm-wheel, G, which engages with a worm, G', on the shaft B', such worm-wheel and worm being the medium through which the shaft $h$ is rotated.

In order to impart rotation from the shaft $h$ to the drum H', the said drum, which, as stated, is loosely mounted on the shaft, carries a pin, $i$, passing through a recess inclosing a spiral spring, $i'$, which tends to force said pin outwardly in the direction of the worm-wheel. The worm-wheel carries also a pin, $e$, which lies loosely within a slot, $e^2$, and is capable of easy longitudinal movement therein. When the shaft $h$ and worm-wheel G are rotated until the pins $i$ and $e$ coincide, the pin $i$ forces the pin $e$ outwardly and enters the slot $e^2$, thereby forming a clutch engagement between the pulley and worm-wheel, which causes the former to turn with the latter, and the table to move to the left through the medium of the rope. Upon the wheels H' and G making a complete revolution, the end of the pin $e$ strikes a beveled projection, $e^3$, on the standard B⁴, and is driven inwardly, thus disconnecting the drum and worm-wheel. A rope and weight, $m$ $m'$, then draws the table back to its original position.

The hinged leaf I (already referred to) is employed as a guard or gage against which the meat is pressed. Said leaf is supported in the frame $t$, and is adapted, by means of the thumb-screws $t'$ $t^2$, to be moved to and from the saw, thus regulating the thickness of slice to be cut. Said leaf is hinged at its lower edge to the inclined table H, and normally stands parallel with the saw D, being held in such position by a spring-latch, M, whose point projects into a hole in a plate, N, attached to the table H. The lower end of the spring-latch M is formed with a finger, M', which projects down below the bottom of the table H, and is adapted to come into contact with a stop, $o$, on the frame of the machine.

J represents a curved track or guard rail, which is fixed to the frame of the machine beneath the leaf I; and $j$ designates a finger which comes into contact with said guard-rail as the table is drawn back from right to left by the weight. When the table is moved in one direction by the feeding device, the finger M' of the spring-latch comes into contact with the stop $o$, attached to the frame of the machine, and said latch being thereby disengaged, the leaf is forced outwardly on its hinges by means of the spring $m^2$, which is attached to the table and arranged to press upon and against the leaf, and the slice of meat is dropped into a suitable receptacle. Upon the return of the table to its first position the guide $j$ rides upon the rail J, returns the leaf to its original position and the latch M, again engaging with the plate N, the leaf is held in position as before.

P designates a hand-wheel on the end of a shaft, which passes along under the bottom of the table H, and $p$ $p$ designates toothed wheels which project up through slots $p'$ $p'$ $p'$ in the table H, said hand-wheel, shaft, and the toothed wheels serving as a means for feeding forward the meat after a slice has been cut therefrom. The table H being at an inclination it will generally be found unnecessary to positively feed forward the meat, as the latter will have a tendency to slide downwardly toward the leaf I.

R designates a spring-clamp, consisting of a bent plate of metal, secured at one end to the table H, and having at the other end a handle, $r$.

S designates a toothed rack with which an edge on the handle $r$ engages, and serves to hold the clamp down upon the meat.

The spring-shackle K, before referred to, is employed for two reasons:

First. When the saw strikes the bone in the meat it will retard the movement of the table H, and as the feeding device is winding up the rope K' at the same rate as before, some means must be employed whereby the rope can be supplied to the drum H' during the slow movement of the table, the same as if it were moving at its usual rate. The spring K will allow for this difference in motion during the severing of the bone.

Second. When the table is returned to the position at the right by means of the weight $m'$, the spring will prevent any jar which might arise if the rope K' were fastened rigidly to the table proper.

Having described our invention, what we desire to claim and secure by Letters Patent is—

1. In a machine for slicing meat, the combination, with a band-saw and a reciprocating table, of a power-shaft through which motion is imparted to said band-saw, a supplementary shaft carrying the lower band-saw pulley, a drum-shaft carrying a loose drum, and a worm-wheel gearing with a worm on said pulley-shaft, a rope connecting said drum with said table, and a clutch or connecting mechanism whereby said worm-wheel and drum may be connected and disconnected, all constructed and arranged substantially as shown and described.

2. In a machine for slicing meat, the combination, with a band-saw and a rociprocating table, of a pulley operated from the driving-shaft of the band-saw and carrying a cord attached to said table, and a cord and weight also attached to said table, substantially as described, whereby the latter will be reciprocated, as set forth.

3. In a machine for slicing meat, the combination, with the reciprocating table H, and the leaf I, hinged thereto and carrying the finger $j$, of the curved rail J, secured to the frame of the machine and adapted to raise said hinged leaf as the table is moved in one direction, substantially as described.

4. In a machine for slicing meat, the combination, with the reciprocating table H, the leaf I, hinged thereto and provided with the finger $j$, attached to said leaf adjacent to its inner or lower edge and near one end thereof, and the guard-rail J, secured to the frame of the machine, of the spring-latch M, attached to said leaf and provided with the finger M', projecting below the bottom of the table, and the stop $o$ upon the frame of the machine, said parts being constructed and operating substantially as described.

In testimony that we claim the foregoing as our own we have hereto affixed our signatures in presence of two witnesses.

GEORGE PUHL.
AUGUST MERTES.

Witnesses:
ALVA A. MOORE,
GEO. W. BACKOFEN.